C. PACK.
MANUFACTURE OF DEVICES FOR RELATIVE ROTATION.
APPLICATION FILED NOV. 29, 1919.
1,363,344.
Patented Dec. 28, 1920.
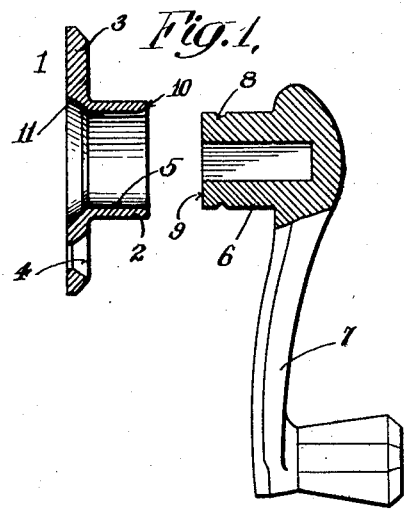
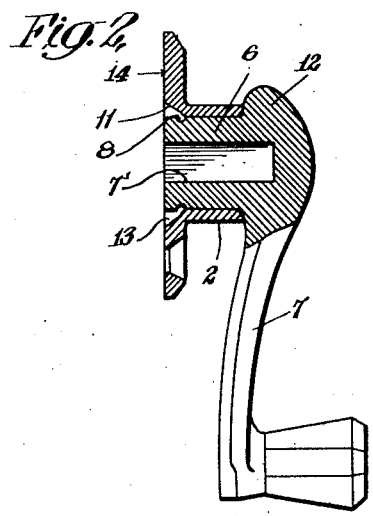
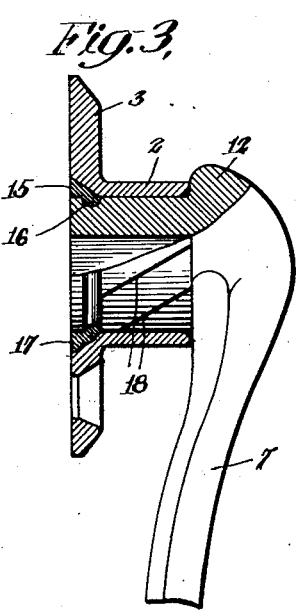
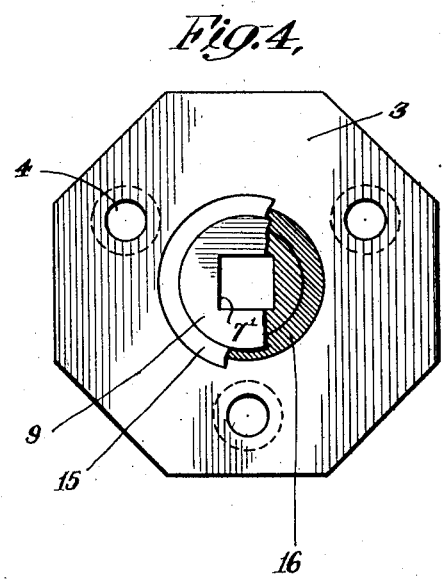
INVENTOR.
Charles Pack
BY
ATTORNEY.

UNITED STATES PATENT OFFICE.

CHARLES PACK, OF BROOKLYN, NEW YORK, ASSIGNOR TO DOEHLER DIE CASTING COMPANY, OF BROOKLYN, NEW YORK, A CORPORATION OF NEW YORK.

MANUFACTURE OF DEVICES FOR RELATIVE ROTATION.

1,363,344.  Specification of Letters Patent.  Patented Dec. 28, 1920.

Application filed November 29, 1919. Serial No. 341,528.

*To all whom it may concern:*

Be it known that I, CHARLES PACK, a citizen of the United States, residing in the borough of Brooklyn, county of Kings, city and State of New York, have invented certain new and useful Improvements in the Manufacture of Devices for Relative Rotation, of which the following is a specification.

My invention relates to the manufacture of devices intended for relative rotation and comprises an improved form of construction for such devices. The particular purpose of my invention is to provide a construction in which relative movement in an axial direction between two relatively rotatable members, such as a sleeve and a cylindrical member within the same, is prevented.

In the construction of a part which is to rotate within another part, such, for example, as a form of door handle having a shank rotatably mounted within a sleeve or boss of a fixed bracket, difficulty is likely to be experienced in so connecting the parts as to prevent relative lengthwise movement of the shank and sleeve. By my invention the parts are connected together in a simple and effective manner so as to permit relative rotation and to prevent lengthwise movement or play, even after a considerable use of the device. The process has the further advantage that the device may be constructed largely by casting operations.

I accomplish the desired result by providing one of the two relatively rotatable members, such, for example, as the shank, with a circumferential groove formed on its cylindrical surface, and providing the other member, such as the sleeve, with a passageway from an outside surface thereof, which is adapted to communicate with the groove referred to when the parts are operatively positioned. If the circumferential groove first referred to is formed on the periphery of the shank, the passageway referred to may take the form of a circular groove on the end surface of the sleeve member, surrounding the shank when the latter is positioned within the sleeve, and communicating with the groove in the shank. The shank being mounted within the sleeve a suitable fluid material which may be adapted to set and harden, such as metal of a low fusing point, is poured or forced through the passageway or groove which extends from an outside surface of one of the members, the metal flowing into and filling both the inside groove and the outside passageway or groove. Upon the hardening of this material a locking ring will be formed within the groove first mentioned, this ring having an offset portion or portions within the other of the two members so as to effectively lock the members against relative lengthwise movement. The inside member may be provided with a shoulder against which an end of the sleeve member will abut, so that it is only necessary to prevent relative movement of the sleeve away from the shoulder. This is accomplished by the ring at the opposite end of the sleeve, specifically referred to above.

In order that my invention may be more clearly understood, attention is hereby directed to the accompanying drawings forming part of this application and illustrating one form of my invention. In the drawings, Figure 1 represents partly in section and partly in side elevation a bracket having a sleeve portion and a handle device having a shank about to be inserted therein; Fig. 2 is a similar view showing the shank inserted within the sleeve; Fig. 3 is a similar view showing the formation of a locking ring by metal cast into the alined openings in the sleeve and shank; and Fig. 4 is a bottom plan view of the finished device, certain parts being shown broken away, and certain parts being shown in section.

Referring to the drawings, the member 1 is provided with a sleeve portion 2 and may additionally have a base flange 3 provided with holes 4 through which screws or the like may be extended to secure the base flange to a desired surface. The sleeve portion 2 of the member is provided with a cylindrical bore 5 in which the cylindrical shank 6 is adapted to be mounted for rotation. The shank 6 is represented as having a handle portion 7 integral therewith, the shank portion 6 being shown as provided with a squared opening 7' extending inwardly from the end of the shank, for the reception of a squared shaft which is to be rotated by the handle 7.

As is stated above, a circumferential groove is formed on the engaging surface of the shank 6 or the sleeve 2, that is to say, either about the periphery of the shank 6 or within the bore of the sleeve 2. The member which is not provided with this groove will be provided with a groove or passageway extending from an exterior surface into communication with the groove first mentioned. In the embodiment of my invention as shown in the drawings, the shank 6 is provided with a groove 8 which extends about the same at a short distance from the end 9 of the shank. The cylindrical bore 5 of the sleeve member extends from the end 10 of the sleeve for a certain distance, beyond which the opening is tapered outwardly as is shown at 11, so that the base flange 3 will have a tapered opening extending therethrough which extends into and forms a continuation of the cylindrical bore 5.

The sleeve member 1 and the member comprising the shank 6 and handle portion 7 may be and preferably are formed by a casting process of a suitable metal such as steel. The groove 8 and the tapered enlargement 11 of the bore of the sleeve member may be formed by machining the parts after the same have been cast, or the parts may be cast with the groove and enlargement. In the form of device illustrated the shank member is provided with a rounded enlargement 12 at the end of the shank portion.

The parts having been prepared as described above, the shank 6 is inserted within the sleeve 2 as is shown in Fig. 2, the enlargement 12 contacting against the end 10 of the sleeve 2 to form a stop. The tapered enlargement 11 of the bore 5 of the sleeve member provides a circumferential groove 13 in the end surface 14 of the member 1, which groove surrounds the end portion of the shank 6 and communicates with the groove 8.

The members being positioned as is shown in Fig. 2, a suitable fluid material for forming the locking device is flowed into the end groove or recess 13. Preferably this takes the form of a suitable metal of low fusing point, which will not bind, when hardened, against either the shank or the sleeve. The members being positioned with the surface 14 of member 1 uppermost, and a suitable frame or gate (not shown) being positioned, the fluid metal is poured into the groove 13 so as to entirely fill the groove 13 and the groove 8 communicating therewith. When this metal has set and hardened a locking ring 15 will be formed thereby as is indicated in Fig. 3. This locking ring comprises an annular portion 16 seated within the groove 8 and an offset portion 17 integral therewith filling the groove 13. Obviously the locking device 15 will prevent lengthwise movement of the shank within the sleeve in one direction while the shoulder formed by the enlargement 12 prevents such movement in the opposite direction, the form of the locking device preventing the same from slipping out of place. If desired a lubricant groove or grooves 18 may be provided upon the surface of the shank 6.

It will be obvious that in practising my improved process and in producing the improved article, I am not limited to the exact details of construction illustrated and specifically described, the breadth of my invention being indicated by the accompanying claims.

What I claim is:—

1. As an article of manufacture, a metallic member comprising a sleeve, a member having a cylindrical shank rotatably mounted in the sleeve, one of said members having a circumferential groove at its surface of contact with the other and the other of said members having a passageway extending from an outside surface thereof into communication with said groove, and a locking device comprising a ring in said groove and a part integral therewith extending into said passageway.

2. As an article of manufacture, a metallic member comprising a sleeve, a member having a cylindrical shank rotatably mounted in the sleeve, said shank having a peripheral groove adjacent its end and said sleeve having a tapered groove in its end surface, surrounding said shank and extending into communication with said first named groove, and a metal annulus mounted within and approximately filling both of said grooves.

3. As an article of manufacture, a member comprising a sleeve, a member having a cylindrical shank rotatably mounted in the sleeve, and a shoulder engaging one end of the sleeve, said shank having a peripheral groove adjacent its end opposite from said shoulder and said sleeve having a groove in its opposite end surface, surrounding said shank and extending into communication with said first named groove, and an annulus mounted within and approximately filling both of said grooves.

This specification signed and witnessed this 26th day of November, 1919.

CHARLES PACK.

Witnesses:
WILLIAM R. AHRBERG,
WILLIAM E. BAUERSCHMIDT.